May 12, 1970        P. R. WEAVER        3,511,088
PRESSURE TRANSDUCER AND TIMING SYSTEM
Filed Aug. 2, 1968        2 Sheets-Sheet 1
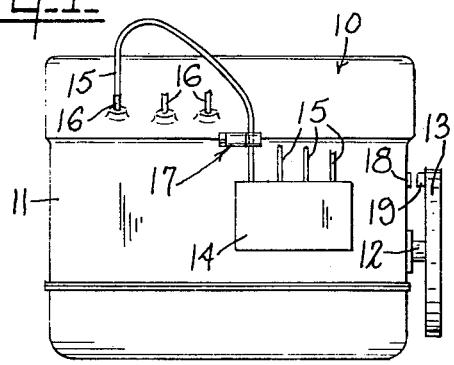
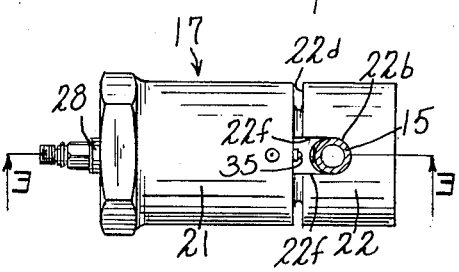
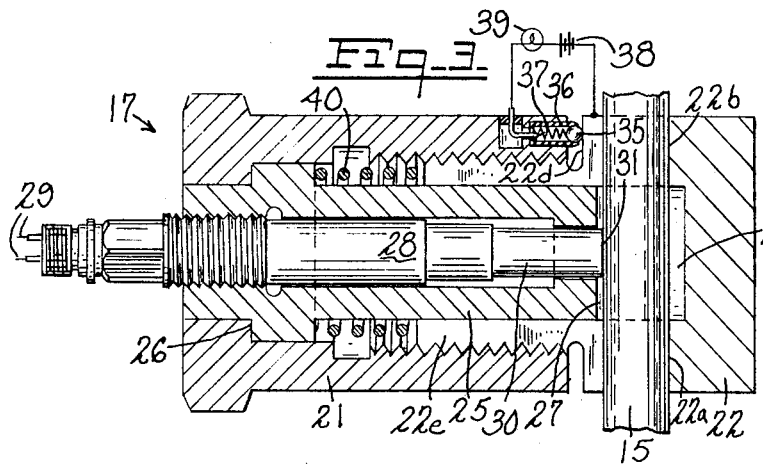
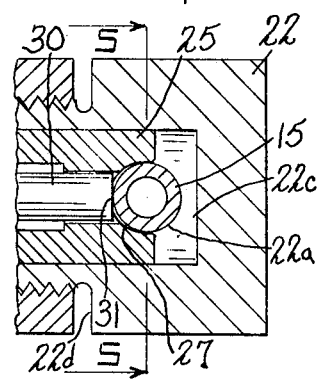
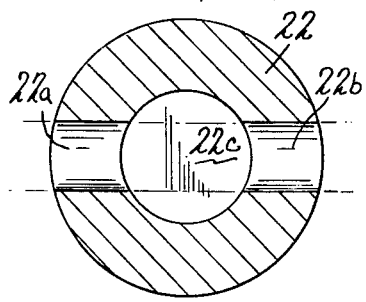
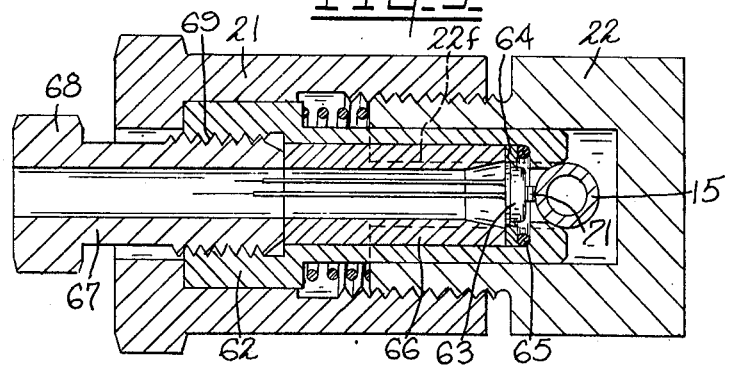
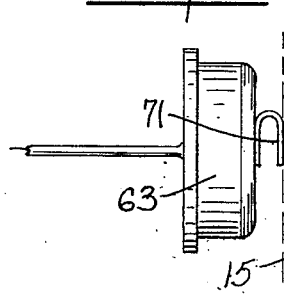
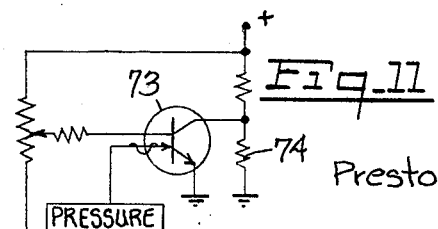
INVENTOR
Preston R. Weaver
BY De Lio and Montgomery
ATTORNEYS

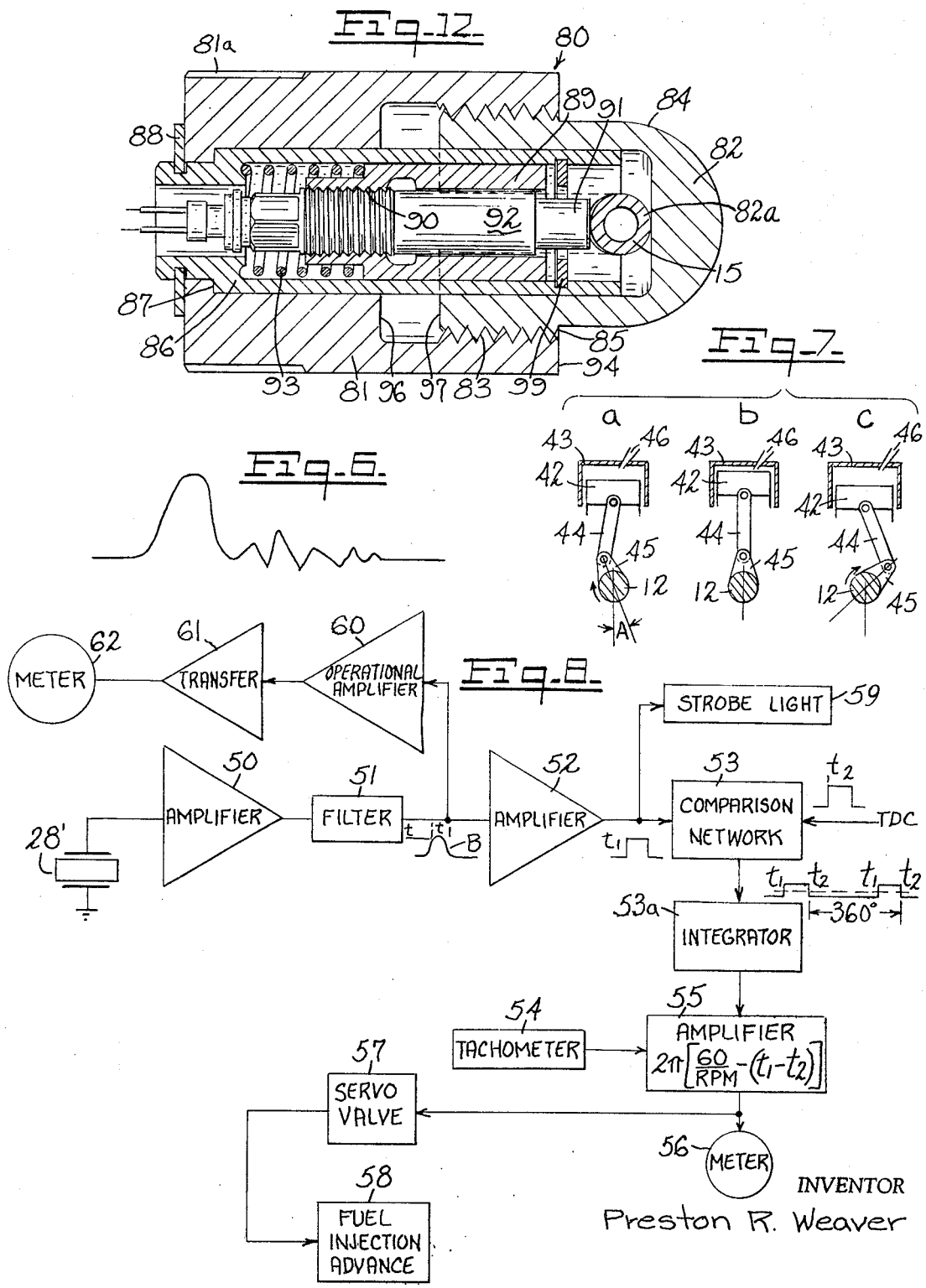

United States Patent Office 3,511,088
Patented May 12, 1970

3,511,088
PRESSURE TRANSDUCER AND TIMING SYSTEM
Preston R. Weaver, Rocky Hill, Conn., assignor to UMC Electronics Company, North Haven, Conn., a corporation of Delaware
Filed Aug. 2, 1968, Ser. No. 749,662
Int. Cl. G01m 15/00
U.S. Cl. 73—119                                        21 Claims

ABSTRACT OF THE DISCLOSURE

A transducer arrangement for detecting fluid pressure in a line and yielding a signal varying with the pressure-time characteristic of the fluid. The transducer may be incorporated in a timing system for internal combustion engines of the fuel injection type to allow accurate timing thereof and resultant minimizing of noxious exhaust gases, and resultant economy of operation.

---

This invention relates to pressure transducers and systems utilizing pressure transducers to derive intelligence from the sensed pressure, and more particularly relates to a pressure transducer and system for checking the timing of an internal combustion engine of the fuel injection type.

A system embodying the pressure transducer of this invention is particularly useful in the timing of diesel engines to reduce the noxious exhaust fumes of diesel engines and thereby combat and reduce air pollution. The system will produce more economical operation of diesel engines through proper timing thereof and resultant savings in fuel.

The injection timing of internal combustion engines, such as diesel engines, where compression combustion of the fuels occurs, has been time-consuming and not wholly accurate. In diesel engines, it is known that to obtain proper timing there is a definite relationship of the time of fuel injection into the cylinder and the time at which the piston in that cylinder reaches top dead center (TDC). It has previously been proposed that the beginning of fuel injection to a cylinder be determined by internally sensing the time of opening of the fuel injection nozzle valve and also internally sensing the build-up of fuel injection pressure at the injection nozzle. However, these systems have found limited usage, primarily, it is believed, because they are relatively complicated and require expensive structural components and modification of the fuel injection system. Accordingly, they have not been acceptable for existing engines.

It has further been proposed to sense the time of fuel injection to a cylinder by sensing expansion of a fuel injection line. The structure proposed for such sensing of injection line expansion has comprised levers actuated by expansion of the line which attempt to provide mechanical amplification of such expansion and actuate an ON-OFF device such as a microswitch.

Such arrangement would have limited accuracy and is merely an OFF-ON device which contains time delays due to the use of the mechanical linkages and, further, would indicate only an unknown value of injection line pressure and be subject to engine vibration that could permit erroneous indication. Still further, such linkage arrangement would require frequent adjustment and readjustment to obtain the proper reference point for actuation of the switch.

Accordingly, the present invention provides a new and improved pressure transducer which provides an electrical signal output which varies directly with the expansion of a fuel line and therefore with the pressure in such fuel line. The expansion of the fuel line, while finite, is very slight and therefore the equipment for measuring such expansion must be quite sensitive and accurate. A pressure transducer embodying the present invention is securely clamped to a fuel line and includes means for establishing a predetermined pressure relationship between the fuel line and pressure sensing element, and provides a means of essentially eliminating from the output any signal generated by engine vibration.

The present invention provides a new and improved pressure transducer which senses the time-pressure characteristic and maximum pressure of a fuel injection charge and yields an output signal directly related to the time-pressure characteristic of the fluid in the line. Such a transducer allows the determination of the time of fuel charge and also allows a measurement of the volume of the fuel charge.

Still further, accurate and repeatably accurate measurement of fluid line pressure may be correlated with the angular position of the engine crankshaft and also the speed of the engine.

An object of this invention is to provide a new and improved pressure transducer.

Another object of this invention is to provide a new and improved timing system for internal combustion engines of the fuel injection type.

Another object of this invention is to provide a new and improved timing system for diesel engines.

Another object of this invention is to provide a new and improved transducer adapted to be coupled to the fuel injection line of a diesel engine with high repeatable accuracy, and provide an electrical signal which varies directly with the pressure of the injected fuel charge.

Another object of this invention is to provide a pressure transducer for measuring pressure in a tubular line by measuring expansion of the line which has new and improved means for engaging the line.

A further object of this invention is to provide a pressure transducer of the type described having new and improved means for establishing a predetermined pre-load or reference pressure between the pressuer sensing element and the line.

The features of the invention which are believed to be novel are particularly pointed out and definitely claimed in the claims attached to and forming a part of this specification. The invention, however, both as to its operation and organization, together with further objects and advantages thereof may best be appreciated by reference to the following detailed description taken in conjunction with the drawings, wherein:

FIG. 1 is the side elevation of a diesel engine;
FIG. 2 is a drawing of a pressure transducer;
FIG. 3 is a longitudinal half section of the transducer of FIG. 2 seen in the plane of lines 3—3 of FIG. 2;
FIG. 4 is a partial sectional view of the transducer of FIG. 3 rotated 90 degrees;
FIG. 5 is a sectional view seen in the plane of lines 5—5 of FIG. 4;
FIG. 6 is a representation of typical pressure time characteristics of a fuel charge in a fuel injection type engine;
FIGS. 7a, 7b, and 7c are representative of the movement of a piston in a cylinder of the engine of FIG. 1;
FIG. 8 is a diagram, partly schematic and partly in block form exemplifying a timing system embodying the invention;
FIG. 9 is a view in longitudinal half-section of another pressure transducer embodying the invention;
FIG. 10 is an enlarged view of a pressure sensitive element shown in FIG. 9;
FIG. 11 is a schematic diagram of a circuit embodying the element of FIG. 10; and
FIG. 12 is a view in longitudinal half section of another embodiment of the invention.

Referring now to the drawings, an internal combustion engine of the diesel type is represented by the reference numeral 10 and comprises an engine block 11 defining a plurality of cylinders with pistons therein, a crankshaft 12 having a flywheel 13 thereon and a fuel injection pump housing 14 having a plurality of injection lines 15 leading to a cylinder fuel injection nozzle represented by the reference numeral 16, each of which injects fuel into a cylinder.

To detect the injected fuel, a transducer housing 17 is provided in pressure sensing engagement with injection line 15. The injection line 15 is formed of metallic tubing of sufficient strength to withstand the high injection pressures. Such tubing will have a very small but finite expansion upon passage of the fuel charge therethrough.

For reasons hereinafter described, a pickup which may be of the magnetic type may be provided to determine when a particular piston is at its top dead center (TDC) position. Such pickup comprises a stationary element 18 on the engine and a movable element 19 on the flywheel. This pickup may be of the magnetic type such that as the element 19 passes element 18 a magnetic circuit is closed and a pulse generated. As will hereinafter be more fully described, the occurrence of each pulse indicate the top dead center position of a piston and, if desired, the frequency of such pulses may indicate engine speed in revolutions per minute or revolutions per second.

The transducer housing 17 (FIGS. 2–5) comprises a body member 21 and a line receiving portion or retaining cap 22 which receives line 15 therethrough in a passage defined by spaced apart, essentially semi-cylindrical recesses 22a and 22b. Cap 22 securely receives line 15 therein and engages line 15 on either side of the portion of line 15 where expansion is detected. Cap member 22 is relieved behind passages 22a and 22b as indicated by reference numeral 22c. The passages 22a and 22b are formed on radii essentially the same as the outside radius of line 15.

Received within body member 21 is an adaptor 25 which has a close sliding fit with member 21 and is positioned therein by means of engaging shoulders 26. Adaptor member 25 has a longitudinal line receiving passage 27 defined therein which is semi-cylindrical and extends into parallel walls 27a and 27b spaced apart essentially the diameter of line 15. Threadably mounted within adaptor 25 is a transducer assembly 28 which carries a pressure sensitive transducer of the piezoelectric type, such as quartz, therein. Electrical leads are connected to the transducer in a conventional manner (not shown) and extend outwardly of assembly 28 as exemplified at 29. If desired, the coupling at the exterior end of the mount for the leads may be of the coaxial type. A satisfactory transducer of this type is the Kistler Piezotron No. 203A2. In this embodiment of the invention a pressure rod 30 extends from assembly 28 and has an end 31 in engagement with line 15. Pressure rod at the other end thereof (not shown) is arranged to apply pressure to the piezoelectric crystal within assembly 28.

It is important that the end of the transducer 31 be positionable in the proper engagement with line 15 with accurate repeatability. To this end a conductive spring-biased ball 35 is carried in member 21 and insulated therefrom by insulating tube 36. Ball 35 is adapted to make electrical contact with under surface 22d of cap member 22 when the shank portion 22e thereof has been threadably fitted into member 21. Ball 35 is so positioned that when shank 22e of cap member 22 has been threadably received in body member 21 a predetermined distance an electrical circuit is closed to indicate the proper positioning of the parts. Such circuit may comprise an insulated lead to spring 37 and a power source 38 together with an indicating lamp 39 or other indicating means. This is done to establish the proper preload or threshold load of pressure rod 30 on line 15 with very accurate repeatability. A spring 40 may be provided between shank 22e and adaptor 25 to provide a desired bias on threaded parts.

With this arrangement, as a charge of fuel is injected under pressure through line 15 the pressure of such fuel will produce expansion of the wall of line 15 and produce a pressure on rod 30 which is directly proportional to the pressure of the fuel in the line. Rod 30 transmits such pressure to the pressure sensitive transducer element which produces a signal which varies directly with the pressure of the fuel in the line.

The transducer housing 17 is securely affixed to line 15 by passing cap member 22 over the line so that the line is received through slots 22f into passages 22a and 22b. Body member 21 with the adaptor and transducer assembly therein is joined to cap member 22 with the line 15 received also in passage 27. The cap member and body member are then threadably joined and the adaptor slides linearly within the body member. The transducer assembly has previously been positioned in the adaptor. When ball 35 engages surface 22d, the proper pressure preload between line 15 and rod 30 is established.

The charge of fuel has a representative pressure-time curve or characteristic which is detected by the transducer. A plot of the pressure as ordinate with respect to time is abscissa is represented as shown in FIG. 6. It will be noted that this pressure characteristic comprises a large pulse followed by substantially smaller variations of increased frequency.

The injection of fuel desirably takes place in predetermined relation to the position of the piston in the cylinder. FIGS. 7a, 7b and 7c exemplify schematically a piston 42 within a cylinder 43 having a connecting rod 44 connected to the throw 5 of a crankshaft 12. In FIG. 7a the piston 42 is moving upwardly upon clockwise rotation of crankshraft 12 and driving piston 42 towards the top dead center position shown in FIG. 7a. In FIG. 7c the fuel which has been injected through nozzle 46 has been ignited and piston 42 is being driven downwardly in a power stroke. In an internal combustion engine, such as a diesel engine, the fuel is injected at a predetermined time before the piston reaches top dead center. Thereafter the air-fuel mixture is compressed and ignites at the top dead center position and upon expansion thereof drives the piston downwardly as shown in FIG. 7c. The difference in the injection position of the piston and top dead center may be expressed by the angle A which, in turn, may be expressed in either degrees or radians.

FIG. 8 illustrates a system for utilizing the intelligence derived from the transducer of FIGS. 2–5. The electrical signal output of crystal 28' is applied to an amplifier 50 which yields an electrical signal corresponding to the pressure-time characteristic shown in FIG. 6. The signal is applied to a filter 51 to filter out the higher frequency components and leave the predominant pressure pulse as shown in waveform B. The waveform B is further applied to an amplifier 52 which may have an input to sense only the magnitude of waveform B above a threshold value T which occurs at a time $t_1$. Amplifier 52 may be further arranged to provide a pulse output having a leading edge occurring at time $t_1$ which is indicative of the time that the pressure in line 15 reaches a predetermined value. The signal is applied to a comparison circuit 53 which may be conveniently in the form of a bi-stable multivibrator. Comparison circuit 53 further receives a top dead center signal from the magnetic pickup 18 at time $t_2$. The time difference between the occurrence of $t_1$ and $t_2$ may be measured by the duration of an output pulse from comparison circuit 53. This pulse may be integrated with respect to time in an integrator 53a to provide a signal of magnitude proportional to the time $t_1-t_2$, or $t_2-t_1$ if desired.

An engine speed signal may be derived from a tachometer 54 coupled to crankshaft 12, or from a network (not shown) which would interrate the top dead center signal with respect to time.

It is quite evident that the revolutions per minute indicated by the signal from the tachometer, if divided by sixty, will give revolutions per second. The reciprocal of this is the time of one revolution or the time of 3606° of motion of the crankshaft. Accordingly, the angular relationship between the point of fuel injection and the piston reaching top dead center may be expressed as $$\varphi = 2\pi \left[ \frac{60}{RPM} - (t_1 - t_2) \right]$$

where $(t_1 - t_2)$ is the time interval between the time of fuel injection and top dead center.

This equation may be easily calculated in an operational amplifier 55 which receives at its input the integrated output of comparison circuit 53 and integrator 53a and a speed voltage of a tachometer 54. The output of amplifier 55 may then be applied to a visual indicating meter 56 to indicate either in degrees or radians the angular relationship between the time of fuel injection and the time the piston reaches top dead center. Appropriate adjustment of the timing between fuel injection and top dead center may then be made either manually or automatically.

The signal from amplifier 55 may be utilized to control a servo valve 57, which, in turn, regulates the engine injection timing advance control 58.

The foregoing equation actually measures the angle between $t_2$ and $t_1$. If desired, this may be read out or utilized as $360° - \varphi$.

The output of amplifier 52 may also be utilized to trigger a strobe light 59 which is directed to the conventional markings on the flywheel and flywheel housing. In this manner, the strobe illuminates the timing markings on the flywheel together with the usual stationary engine marking in a manner well known to those skilled in the art. This provides a visual indication of the instantaneous position of the crankshaft and top dead center with the time of fuel injection into cylinder 22.

The invention further provides a means for measuring the volume of the charge in the injection line.

In this application the output waveform B of filter 51 is applied with or without further amplification to an operational amplifier 60 which solves the Bernoulli equation in combination with the equation of continuity. The output of operational amplifier 60 may be applied to a further amplifier 61 which would introduce any necessary additional transfer function with respect to time and the resultant output of amplifier 61 is applied to a meter 62 or other desired visual indicating or recording device, or control system, which registers in cubic centimeters or other suitable units the volume of fuel in each charge or which controls emission of unburned hydrocarbons.

It will be understood, of course, that all of the circuits shown in FIG. 8 may not be utilized at one time. For example, at times, measurements may only be desired of the volume of fuel per charge without desiring intelligence on the angular relationship of time for injection and top dead center of the piston and vice versa.

The invention encompasses the use of a plurality of different transducing elements. FIG. 9 illustrates another form of transducer in longitudinal half section. This transducer comprises the same two-piece housing in the form of body member 21 and cap member 22. In external appearance, this transducer housing appears essentially as shown in FIG. 2. An adaptor body 62 is received within the housing and seated against internal shoulders 26 of body member 21. The transducing element in this case is a pressure sensitive transistor in a casing 63 which is secured, as being bonded with an epoxy cement, to a non-conductive washer-like element 64. Element 64 is spaced within adaptor 62 by an O-ring 65. A sleeve 66 is slidably received within adaptor 62 and bears on element 64 to positively locate transistor casing 63. A pressure adjusting element 67 having a knob 68 is threadably received within adaptor 62 in threads 69. The pressure adjusting member 76 may be utilized to adjust the pressure between line 15 and the transistor. The transducer may be a silicone planar NPN transistor with a stress sensitive emitter-base junction. Mechanical inputs can be pressures applied across the top of the case or forces applied to the diaphragm center. Such a device is available from Stowe Laboratories, Inc. and known as a Model PT-2 Pitran Piezotransistor. This transistor produces a linear output with a pressure applied to the emitter-base junction. The pressure voltage characteristic may very somewhat dependent upon the voltage across the collector and emitter. A schematic diagram of a circuit utilizing the transistor is shown in FIG. 11.

The transistor is quite sensitive and to insure that it is not overloaded by pressure, a pressure transmitting device having an amplification factor of less than one is disposed between line 15 and casing 63. Such pressure transmitting device may take the form of a U-shaped spring 71 (FIG. 10) which is disposed between the exterior wall of line 15 and the pressure sensitive container and affixed to casing 63. The transistor circuitry is shown in FIG. 11, and essentially is an NPN transistor 73 with positive base bias which is affected by pressure applied to the base-emitter junction. The resistance 74 represents a load.

The transducer assembly of FIG. 8 may include the same positioning arrangement as that shown in FIG. 3, namely, the conductive ball 35 adapted to make electrical contact with cap 22.

A still further embodiment of the invention as it relates to pressure sensitive transducer assemblies is shown in FIG. 12 and comprises a housing 80 having a body member 81 and a cap member 82. The cap member 82 is adapted to be internally threaded to body member 81 as by means of mating threads 83. The threads on cap 82 are upstanding from the peripheral surface 84 of cap 82 to provide a flange-like surface 85. An adaptor 86 is seated within body member 81 against internal shoulder 87 and locked thereto by means of a snap ring 88.

Adaptor 86 serves as a transducer housing and receives therein a transducer mount 89 which threadably carries the transducer casing by mating threads at 90. The transducer element includes a pressure rod 91 which acts as a push-rod on a piezoelectric element (not shown) within portion 92 and which bears on line 15. A helical spring 93 provides a spring loading between transducer mount 89 and adaptor 86 so that the transducer sensing element or pressure rod 91 will be forced against line 15 by a controllable amount. The reaction of this force is carried to the body member 81.

In assembly, cap member 82 is first placed around line 15 and receives in the semi-cylindrical passage 82a defined therein the sidewall of line 15. The body member 81 is then screwed to cap member 82 until surfaces 85 of cap member 82 coincide with surface 94 on body member 81. A knurled ring 81a may be defined on body member 81 to facilitate joining of members 81 and 82. When surfaces 85 and 94 reside in the same plane, the desired preload on the pressure sensing element is established.

The flushness of surfaces 85 and 94 may be electrically detected in the same manner as shown in FIG. 3 by placing a contact between the surfaces 96 and 97.

Snap ring 99 together with a snap ring 88 acts to prevent the transducer mount from becoming disengaged from body member 81 during assembly and disassembly.

The foregoing transducer assemblies serve the function of firmly receiving the line 15 therethrough and establishing a correct engagement or preload between the pressure sensing element and the sidewall of line 15. This eliminates or minimizes any pressure picked up by the transducer due to vibration from the engine and further securely clamps the transducer housing to the pressure line. This arrangement further insures that the pressure sensitive element is always in contact with line 15 and adapted to be influenced by any expansion thereof due to fluid pressure therein. The line 15 is securely held in the transducer housings as shown in spaced apart passages on either side of the portion of the line where pressure expansion is sensed.

While the pressure sensitive elements have been disclosed as piezoelectric crystals and pressure sensitive transistors, other types of movement or pressure sensitive pickups may be utilized. For example, expansion of line 15 may be detected with a linear variable differential transformer and associated discriminator, a capacitance type pressure receiver, a magnetostrictive pressure receiver, and other suitable devices which will yield a signal which varies with pressure applied thereto.

With the intelligence derived from transducers and systems embodying the invention, the time of fuel injection may be adjusted in conventional manners for most efficient combustion and reduction of noxious exhaust fumes. Moreover, the volume of fuel charges may be monitored.

It is to be understood that the transducing arrangements embodying the invention may be utilized in many environments to monitor and derive a fluid-pressure-time characteristic.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. For use in combination with a tubular line adapted to have fluid charges under pressure intermittently pass therethrough, a housing member, a transducer supporting member, a transducer carried by said supporting member, said transducer being effective to generate an electrical signal which varies as a function of pressure exerted thereon, a coupling for clamping said housing to the line, said supporting member and said transducer being mounted in said housing so as to be subjected to pressure by movement of the line due to fluid pressure therein and generate a signal representative of the pressure-time characteristic of the fluid charges in the line, and means coupled to said transducer for detecting a predetermined level of an electrical signal generated by said transducer.

2. The arrangement of claim 1 further including means on said housing member and said coupling member for determining a reference position of said transducer with respect to said line.

3. The arrangement of claim 1 wherein said housing member defines aligned spaced apart passages adapted to receive the fluid line, and said transducer is carried in said housing so as to sense expansion of the line between the passages.

4. The arrangement of claim 1, further comprising means for establishing a predetermined pressure preload between the wall of the line and the transducer.

5. A pressure detecting arrangement adapted to measure fluid pressure in a line comprising a first member having an externally threaded shank portion, a pair of diametrically opposed slots extending along said shank portion and terminating in semi-cylindrical spaced apart passages adapted to receive the line, said second member having an internally threaded base adapted to receive said shank portion, and a pressure sensitive transducer carried in said second member and arranged to be subjected to pressure by expansion of the line between said passages due to fluid pressure in the line.

6. The arrangement of claim 5 further including means for indicating when said transducer is in a predetermined position with respect to the line.

7. The arrangement of claim 6 wherein said first and second members have parallel surfaces, and said transducer is in said predetermined position when said surfaces are co-planar.

8. The arrangement of claim 5 wherein said members have parallel surfaces, and means for indicating when said parallel surfaces are in a predetermined position.

9. A system for measuring fuel injection in an internal combustion engine wherein a fuel charge is applied to engine cylinders through a fuel injection line, a pressure sensitive transducer adapted to generate an electrical signal which varies directly with pressure in the line, and means for integrating with respect to time the electrical signal to derive the volume of fuel in the injected fuel charge.

10. A system measuring the relationship of piston position and time of fuel injection in an internal combustion engine of the fuel injection type, comprising means for deriving a signal indicative of a predetermined position of a piston in its cylinder, means for deriving a signal which varies directly with the pressure-time characteristic of an injected fuel charge into the cylinder, means for detecting the occurrence of a predetermined pressure of the fuel charge, and means for measuring the time between the piston position and the occurrence of a predetermined pressure.

11. The system of claim 10 further including means for correlating said time as a function of engine speed to measure the angle of the engine crankshaft between the time of fuel injection and the top dead center position of the piston in the cylinder.

12. For use in combination with a tubular line adapted to have charges of fluid under pressure pass therethrough, a housing member, said housing member defining a passage therethrough for said line, means for clamping said housing to the line, a pressure sensitive transducer adapted to generate an electrical signal which varies directly with pressure exerted thereon, said transducer being mounted in said housing so as to be subjected to pressure by expansion of the line due to fluid pressure therein, means for amplifying said signal to derive the pressure-time characteristic of a fluid charge in said line, and means for integrating with respect to time said characteristic to measure the volume of fluid in the charge.

13. For use in combination with a fuel injection line of an internal combustion engine adapted to have fuel charges under pressure pass therethrough, a housing member, said housing member defining a passage therethrough for said line, means for clamping said housing to the line, a pressure sensitive transducer adapted to generate an electrical signal which varies as a function of the pressure exerted thereon, said transducer being mounted in said housing so as to be subjected to expansion of the line due to fluid pressure therein and provide a signal representative of the pressure-time characteristic of each fuel charge in the line, means for detecting a predetermined position of a piston in a cylinder of the engine, and means for measuring time between a predetermined piston position and a predetermined level of the generated electrical signal.

14. The arrangement of claim 13 wherein said transducer is a piezoelectric device.

15. The arrangement of claim 13 wherein said transducer is a pressure sensitive transistor.

16. The arrangement of claim 13 further including means for establishing a predetermined pressure preload between said transducer and the line.

17. A system for measuring the relationship of piston position and time of fuel injection in an internal combustion engine of the fuel injection type, comprising means for deriving a signal indicative of a predetermined position of a piston in its cylinder, means for deriving an electrical signal which varies as a function of the pressure-time characteristic of an injected fuel charge into the cylinder, means for detecting the occurrence of a predetermined level of the electrical signal, and means for measuring the time between the predetermined piston position and the occurrence of the predetermined signal level.

18. The system of claim 17 further comprising means for deriving a signal indicative of the speed of rotation of the engine, and means responsive to the engine speed signal and the time between the predetermined piston position and the predetermined signal level for indicating the angular relationship between the predetermined signal level and the predetermined piston position with respect to the top dead center position of the piston.

19. A method of measuring the relationship of the position of a piston and the time of fuel injection in a fuel line of an internal combustion engine of the fuel injection type, comprising the steps of, detecting the occurrence of a fuel charge in the line and generating a signal which varies as a function of the pressure-time characteristic of the charge, detecting when a piston is in a predetermined position in its cylinder, and measuring the time between the predetermined piston position and a predetermined level of the signal.

20. The method of claim 19 including the further step of measuring the angular relation of the piston at the time of detecting the predetermined signal level with respect to the top dead center position of the piston.

21. For use in combination with a tubular line adapted to have fluid under pressure pass therethrough, a housing member, said housing member defining a passage therethrough for said line means for clamping said housing to the line, a pressure-sensitive transducer adapted to generate an electrical signal which varies with pressure exerted thereon, said transducer being mounted in said housing so as to be subjected to pressure by expansion of the line due to pressure therein, said housing member having a shank portion, a pair of diametrically opposed slots extending along said shank portion to said passage and cooperative means on said shank portion and said clamping means for securing said housing member to the line.

References Cited

UNITED STATES PATENTS

| | | | |
|---|---|---|---|
| 1,861,999 | 6/1932 | Bowlus | 73—151 X |
| 2,192,863 | 4/1940 | Hetzel et al. | |
| 3,240,207 | 3/1966 | Barker et al. | 73—398 X |
| 3,293,584 | 12/1966 | Legat et al. | |
| 3,327,526 | 6/1967 | North. | |
| 3,412,602 | 11/1968 | Rush et al. | |
| 2,867,043 | 1/1959 | Jarret et al. | |

JERRY W. MYRACLE, Primary Examiner

U.S. Cl. X.R.

73—398

PO-1050
(5/69)

UNITED STATES PATENT OFFICE
CERTIFICATE OF CORRECTION

Patent No. 3,511,088        Dated May 12, 1970

Inventor(s)    Preston R. Weaver

It is certified that error appears in the above-identified patent and that said Letters Patent are hereby corrected as shown below:

Column 2, line 40, "pressuer" should read --pressure--. Column 3, line 24, "indicate" should read --indicates--. Column 4, line 33, "5" should read --45--. Column 4, line 36, "Fig. 7a" should read --Fig. 7b--. Column 5, line 4, "3606°" should read --360°--. Column 6, line 4, "76" should read --67--. Column 6, line 14, "very" should read --vary--. Column 5, line 60, "for" should read --of--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents